United States Patent
Toskala

(10) Patent No.: US 8,787,247 B2
(45) Date of Patent: Jul. 22, 2014

(54) APPARATUS AND METHODS FOR TRANSMITTING PAGING MESSAGES FOR PEER TO PEER COMMUNICATION

(75) Inventor: Antti Anton Toskala, Espoo (FI)

(73) Assignee: Nokia Siemens Networks Oy, Espoo (FI)

( * ) Notice: Subject to any disclaimer, the term of this patent is extended or adjusted under 35 U.S.C. 154(b) by 134 days.

(21) Appl. No.: 13/381,741

(22) PCT Filed: Jun. 30, 2009

(86) PCT No.: PCT/EP2009/058223
§ 371 (c)(1),
(2), (4) Date: Feb. 22, 2012

(87) PCT Pub. No.: WO2011/000419
PCT Pub. Date: Jan. 6, 2011

(65) Prior Publication Data
US 2012/0155410 A1    Jun. 21, 2012

(51) Int. Cl.
*H04B 7/212* (2006.01)
*H04W 84/12* (2009.01)

(52) U.S. Cl.
CPC ............. *H04B 7/212* (2013.01); *H04W 84/12* (2013.01)
USPC .......................................... 370/322; 370/348

(58) Field of Classification Search
CPC ................................ H04B 7/212; H04W 84/12
USPC .............. 370/302, 310.2, 314, 319, 322, 328, 370/324, 329, 330, 338, 341, 349, 350, 348, 370/321, 337, 347
See application file for complete search history.

(56) References Cited

U.S. PATENT DOCUMENTS

| | | | | |
|---|---|---|---|---|
| 5,903,618 A * | 5/1999 | Miyake et al. | | 375/356 |
| 5,956,329 A * | 9/1999 | Pernice et al. | | 370/336 |
| 7,283,832 B2 * | 10/2007 | Jia et al. | | 455/517 |
| 7,286,842 B2 * | 10/2007 | Li et al. | | 455/502 |
| 7,336,638 B2 * | 2/2008 | Cheng et al. | | 370/338 |
| 8,577,363 B2 * | 11/2013 | Wijting et al. | | 455/426.1 |
| 2009/0010231 A1 * | 1/2009 | Laroia et al. | | 370/338 |
| 2009/0010232 A1 * | 1/2009 | Laroia et al. | | 370/338 |
| 2009/0017843 A1 * | 1/2009 | Laroia et al. | | 455/458 |

FOREIGN PATENT DOCUMENTS

| | | |
|---|---|---|
| JP | 2006522534 A | 9/2006 |
| WO | WO 2004/080103 A1 | 9/2004 |
| WO | WO 2008/005922 A2 | 1/2008 |
| WO | WO 2008034038 A1 | 3/2008 |
| WO | WO 2009/009379 A1 | 1/2009 |
| WO | WO 2009/009394 A1 | 1/2009 |

OTHER PUBLICATIONS

"Interference-aware resource allocation for device-to-device radio underlaying cellular networks," Vehicular Technology Conference, 2009. VTC Spring 2009 Pekka Jänis et al. (5 pages).

* cited by examiner

*Primary Examiner* — Brenda H Pham
(74) *Attorney, Agent, or Firm* — Harrington & Smith

(57) ABSTRACT

Apparatus and method for communication are provided. The apparatus is configured to send a message to a network element, the message including information on the establishment of a device-to-device connection with at least one apparatus; and receive from a network element information regarding a timing reference for paging messages between the apparatuses establishing a device-to-device communication.

31 Claims, 4 Drawing Sheets

APPARATUS AND METHODS FOR TRANSMITTING PAGING MESSAGES FOR PEER TO PEER COMMUNICATION

FIELD

The exemplary and non-limiting embodiments of the invention relate generally to wireless communication networks. Embodiments of the invention relate especially to device-to-device communication.

BACKGROUND

The following description of background art may include insights, discoveries, understandings or disclosures, or associations together with disclosures not known to the relevant art prior to the present invention but provided by the invention. Some of such contributions of the invention may be specifically pointed out below, whereas other such contributions of the invention will be apparent from their context.

Wireless communication systems are constantly under development. Developing systems provide a cost-effective support of high data rates and efficient resource utilization. One communication system under development is the 3rd Generation Partnership Project (3GPP) Long Term Evolution (LTE) Release 8. An improved version of the Long Term Evolution radio access system is called LTE-Advanced (LTE-A). The LTE is designed to support various services, such as high-speed data, multimedia unicast and multimedia broadcast services.

In addition to cellular operation, in most systems direct device-to-device communication is possible. In current methods for device-to-device communication, low power technologies such as Bluetooth or Wireless Local Area Networks (WLAN) have been used. In these solutions, the communication is totally independent of the communication infrastructure and is usually based on users being in line of sight with each other. In networks designed for use by government agencies and emergency services, such as Tetra (Terrestrial trunked radio), device-to-device communication has been implemented but those solutions are not suitable for use in general communication networks.

As certain frequency bands (so-called White Spaces) are proposed to be reserved for non-cellular radio use there is a need for realizing device-to-device communication having a longer range than the line of sight. The development of such solution faces several challenges. For example, the solution should be able to work without causing interference to cellular operation and allow minimizing of extra device power consumption.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to a more detailed description that is presented later.

According to an aspect of the present invention, there is provided an apparatus configured to: send a message to a network element, the message comprising information on the establishment of a device-to-device connection with at least one apparatus; and receive from a network element information regarding a timing reference for paging messages between the apparatuses establishing a device-to-device communication.

According to another aspect of the present invention, there is provided a method comprising: sending by an apparatus a message to a network element, the message comprising information on the establishment of a device-to-device connection with at least one apparatus; and receiving by an apparatus from a network element information regarding a timing reference for paging messages between the apparatuses establishing a device-to-device communication.

According to an aspect of the present invention, there is provided an apparatus configured to: receive a message from user equipment, the message comprising information on the establishment of a device-to-device connection with at least one other set of user equipment, send a message regarding the establishment to the at least one other set of user equipment; and send information regarding a timing reference for paging messages between the apparatuses establishing a device-to-device communication to the apparatuses.

According to another aspect of the invention, there is provided a method comprising: receiving a message from user equipment, the message comprising information on the establishment of a device-to-device connection with at least one other set of user equipment, sending a message regarding the establishment to the at least one other set of user equipment; and sending information regarding a timing reference for paging messages between the apparatuses establishing a device-to-device communication to the apparatuses.

According to another aspect of the present invention, there is provided an apparatus comprising: means for sending a message to a network element, the message comprising information on the establishment of a device-to-device connection with at least one apparatus; and means for receiving from a network element information regarding a timing reference for paging messages between the apparatuses establishing a device-to-device communication.

According to another aspect of the present invention, there is provided an apparatus comprising: means for receiving a message from user equipment, the message comprising information on the establishment of a device-to-device connection with at least one other set of user equipment, means for sending a message to the at least one other set of user equipment regarding the establishment; and means for sending information regarding a timing reference for paging messages between the apparatuses establishing a device-to-device communication to the apparatuses.

According to another aspect of the present invention, there is provided a computer readable memory embodying a program of instructions executable by a processor to perform actions directed at establishing a connection, the actions comprising: sending a message to a network element, the message comprising information on the establishment of a device-to-device connection with at least one apparatus; and receiving from a network element information regarding a timing reference for paging messages between the apparatuses establishing a device-to-device communication.

According to yet another aspect of the present invention, there is provided a computer readable memory embodying a program of instructions executable by a processor to perform actions directed at establishing a connection, the actions comprising: receiving a message from user equipment, the message comprising information on the establishment of a device-to-device connection with at least one other set of user equipment, sending a message to the at least one other set of user equipment regarding the establishment; and sending information regarding a timing reference for paging messages between the apparatuses establishing a device-to-device communication to the apparatuses.

LIST OF DRAWINGS

Embodiments of the present invention are described below, by way of example only, with reference to the accompanying drawings, in which FIG. 1A shows a simplified block diagram illustrating an exemplary system architecture;

DESCRIPTION OF SOME EMBODIMENTS

Exemplary embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

Embodiments of present invention are applicable to any user terminal, server, corresponding component, and/or to any communication system or any combination of different communication systems where device-to-device communication is supported. The communication system may be a wireless communication system or a communication system utilizing both fixed networks and wireless networks. The protocols used and the specifications of communication systems, servers and user terminals, especially in wireless communication, develop rapidly. Such development may require extra changes to an embodiment. Therefore, all words and expressions should be interpreted broadly and are intended to illustrate, not to restrict, the embodiment.

Figure 1A:
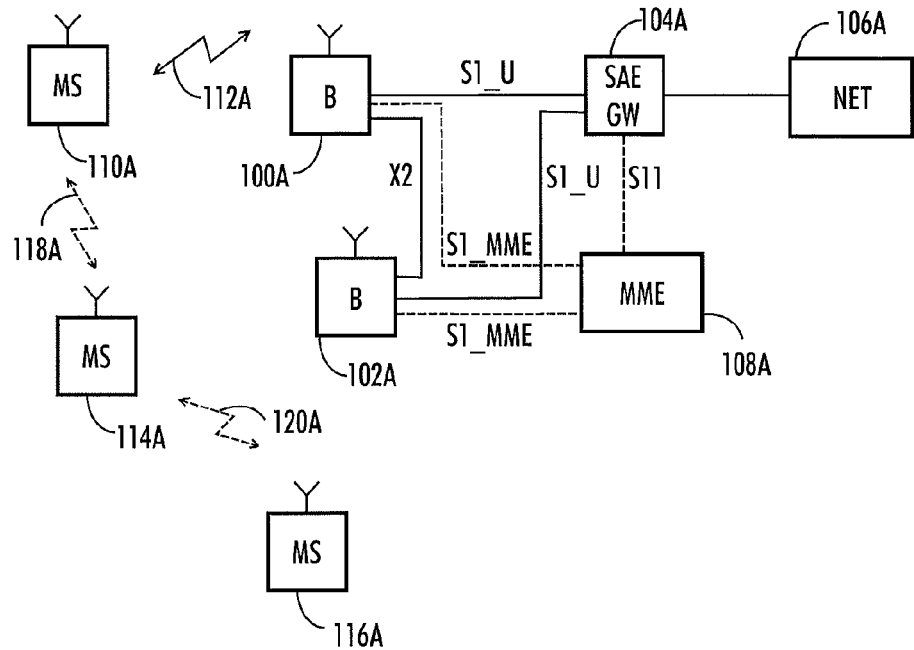
FIG. 1B illustrates examples of apparatuses according to embodiments of the invention.

With reference to FIG. 1A, let us examine an example of a radio system to which embodiments of the invention can be applied. In this example, the radio system is based on LTE network elements. However, the invention described in these examples is not limited to the LTE radio systems but can also be implemented in other radio systems, such as UMTS (Universal Mobile Telecommunications System). In an embodiment, the presented solution may be applied between user equipment belonging to different but compatible systems such as LTE and UMTS.

A general architecture of a communication system is illustrated in FIG. 1A. FIG. 1A is a simplified system architecture only showing some elements and functional entities, all being logical units whose implementation may differ from what is shown. The connections shown in FIG. 1A are logical connections; the actual physical connections may be different. It is apparent to a person skilled in the art that the systems also comprise other functions and structures. It should be appreciated that the functions, structures, elements, and protocols used in or for group communication are irrelevant to the actual invention. Therefore, they need not be discussed in more detail here. The exemplary radio system of FIG. 1A comprises a service core of an operator including the following elements: an MME (Mobility Management Entity) 108A and an SAE GW (SAE Gateway) 104A.

Base stations that may also be called eNBs (Enhanced node Bs) 100A, 102A of the radio system host the functions for Radio Resource Management: Radio Bearer Control, Radio Admission Control, Connection Mobility Control, Dynamic Resource Allocation (scheduling). The MME 108A is responsible for distributing paging messages to the eNBs 100A, 102A. The eNBs are connected to the SAE GW with an S1_U interface and to MME with an S1_MME interface. The eNBS may be connected to each other with X2 interface.

FIG. 1A shows user equipment 110A and 114A located in the service area of the eNodeB 100A and user equipment 116A located in the service area of with the eNodeB 102A. The user equipment refers to a portable computing device. Such computing devices include wireless mobile communication devices operating with or without a subscriber identification module (SIM), including, but not limited to, the following types of devices: mobile phone, smartphone, personal digital assistant (PDA), handset, laptop computer.

In the example situation of FIG. 1A, the user equipment 110A has a connection 112A with the eNodeB 100A. The connection 112A may relate to a call/a service which may be "long distance" where user traffic passes via the SAE GW 104A. For example, a connection from the user equipment 110A to an external IP network, such as to the Internet 106A, may be guided via the SAE GW 108. However, local calls/services are also possible in the exemplary radio system.

FIG. 1A only illustrates a simplified example. In practice, the network may include more base stations and radio network controllers, and more cells may be formed by the base stations. The networks of two or more operators may overlap, the sizes and form of the cells may vary from what is depicted in FIG. 1, etc.

The physical layer of the LTE includes orthogonal frequency division multiple access (OFDMA) and multiple-input and multiple-output (MIMO) data transmission. For example, the LTE deploys the OFDMA for the downlink transmission and single carrier frequency division multiple access (SC-FDMA) for the uplink transmission. In OFDMA, the transmission frequency band is divided into multiple sub-carriers orthogonal to each other. Each sub-carrier may transmit data to a specific UE. Thus, multiple access is achieved by assigning subsets of sub-carriers to any individual UE. SC-FDMA utilizes single carrier modulation, orthogonal frequency domain multiplexing and frequency domain equalization.

Embodiments of the invention are not limited to any particular multiple access method.

In the uplink direction, the LTE-A provides a Physical Uplink Shared Channel (PUSCH) for transmitting user data. The resources of PUSCH are allocated by the network and signalled on a control channel to user equipment.

It should be appreciated that the communication system may also comprise other core network elements besides SAE GW 104A and MME 108A. Direct communication between different eNodeBs over an air interface is also possible by implementing a relay node concept, wherein a relay node may be considered as a special eNodeB having wireless backhauls or, for instance, X2 and S1 interfaces relayed over the air interface by another eNodeB. The communication system is also able to communicate with other networks, such as a public switched telephone network.

The embodiments are not, however, restricted to the network given above as an example, but a person skilled in the art may apply the solution to other communication networks provided with the necessary properties. For example, the connections between different network elements may be realized with Internet Protocol (IP) connections.

Figure 1B:
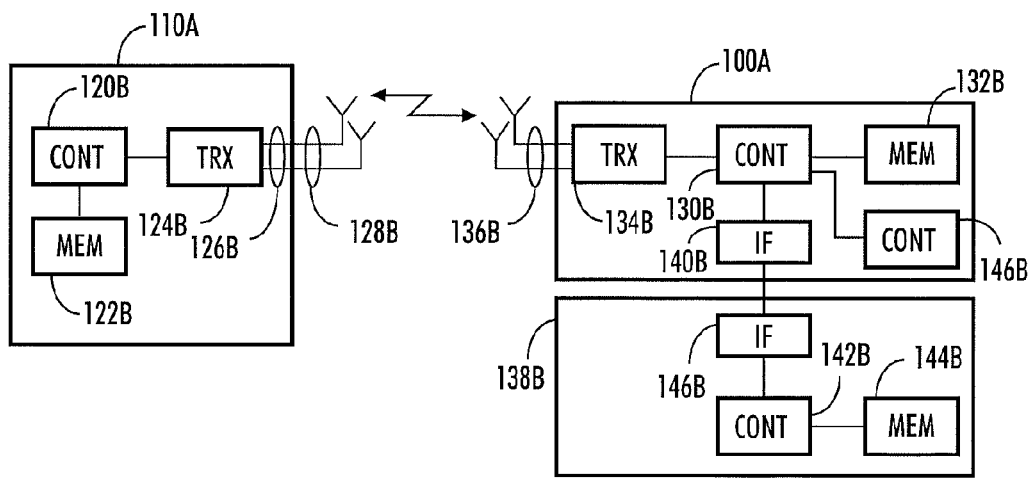

FIG. 1B illustrates examples of apparatuses according to embodiments of the invention. FIG. 1B shows user equipment 110A located in the area of the base station or eNodeB 100A. The user equipment is configured to be in connection with the base station 100A. The user equipment 110A comprises a controller 120B operationally connected to a memory 122B and a transceiver 124B. The controller 120B controls the operation of the user equipment. The memory 122B is configured to store software and data. The transceiver is configured to set up and maintain a wireless connection to the base station 100A. The transceiver is operationally connected to a set of antenna ports 126B connected to an antenna arrangement 128B. The antenna arrangement may comprise a set of antennas. The number of antennas may be one to four, for example. The number of antennas is not limited to any particular number.

The user equipment may also comprise various other components, such as a user interface, camera, and media player. They are not displayed in the figure due to simplicity.

The base station or eNodeB 100A comprises a controller 130B operationally connected to a memory 132B and a transceiver 134B. The controller 130B controls the operation of the base station. The memory 132B is configured to store software and data. The transceiver 134B is configured to set up and maintain a wireless connection to user equipment within the service area of the base station. The transceiver 134B is operationally connected to an antenna arrangement 136B. The antenna arrangement may comprise a set of antennas. The number of antennas may be two to four, for example. The number of antennas is not limited to any particular number.

The base station may be operationally connected to another network element 138B of the communication system. The network element 138B may be an MME (Mobility Management Entity), an SAE GW (SAE Gateway), a radio network controller (RNC), another base station, a gateway, or a server, for example.

The base station may be connected to more than one network element. The base station 100A may comprise an interface 140B configured to set up and maintain connections with the network elements. The network element 138B may comprise a controller 142B and a memory 144B configured to store software and data and an interface 146B configured to be in connection with the base station. In an embodiment, the network element is connected to the base station via another network element.

In cellular systems, the network utilises paging when there is data to be sent to user equipment. The network sends a paging message to the user equipment so that the user equipment is ready to receive data packets. When in idle mode, the user equipment is configured to monitor paging messages from the network during given time instants so that the receiver may be turned off at other times to save battery power.

In device-to-device communication, the participating devices may send each other a paging message when they want to transmit. If each device would continuously receive and try to decode the incoming signal, the battery consumption could be rather high. By using paging messages, battery consumption may be greatly reduced. When user equipment has received a paging message from other set of user equipment it may acknowledge the reception of the message and start receiving data from the transmitting user equipment.

In an embodiment of the invention, when user equipment wishes to establish a device-to-device connection, it contacts the network it is connected to. The network contacts the destination user equipment and determines suitable time instants for paging messages.

When the sets of user equipment participating in the device-to-device communication have received timing references from the network, they may monitor each other's paging messages during the given time instants. The receiver power consumption of a device participating in the device-to-device communication is minimized as it only needs to listen to the other device at predefined moments. Because the network determines suitable timing instants, the network may allocate the timing instants such that there is no overlap with the device-to-device paging messages and the paging messages sent by the cellular system.

In addition, user security can be enhanced with authentication provided via the cellular system.

In an embodiment, the network also determines a suitable communication carrier, frequency or frequency band for sending and receiving paging messages and data transmission. Thus, the use of spectrum allowed to the device-to-device communication is ensured.

In an embodiment, the operation of multiple devices (more than 2 party communications) may be coordinated.

Figure 2A:
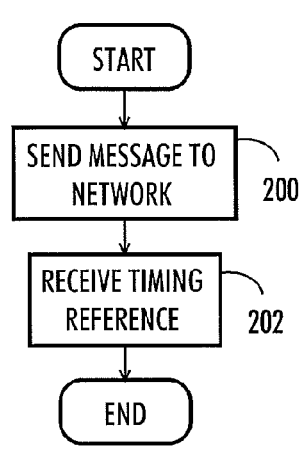
FIGS. 2A to 2E are flow charts illustrating embodiments of the invention.

FIG. 2A is a flow chart illustrating an embodiment. In this example, user equipment 110A wishes to start device-to-device communication 118A with user equipment 114A.

In step 200, user equipment sends a message to the eNodeB 100A, the message comprising information on the establishment of a device-to-device connection with another UE. In an embodiment, the message comprises an identifier of the user equipment with which the user equipment 110A wishes to start communication. The identifier is a phone number, IP address (Internet Protocol address) or email address of the user equipment or any other data which identifies the user equipment to the network element.

The message may be sent on a control channel to the eNodeB. If the user equipment 110A is in idle mode, the user equipment 110A may utilise an LTE RACH (random access channel) procedure to obtain a Physical Uplink Shared Channel (PUSCH) resource from the eNodeB 100A. After the resource has been obtained the user equipment may send the message to the eNodeB.

In an embodiment, the user equipment 110A may already be in connected mode. Some other applications could be running in the user equipment, the applications requiring a connection to the Internet. For example, an application or widget (like weather info) may require a data update at given intervals. In such a case, the user equipment would be in active mode (RRC-connected mode) when setting up the device-to-device connection. In connected mode, the user equipment may send the message directly on PUSCH as the resource is already available.

In step 202, the user equipment receives from the eNodeB information regarding a timing reference for paging messages between the apparatuses establishing a device-to-device communication.

Figure 2B:
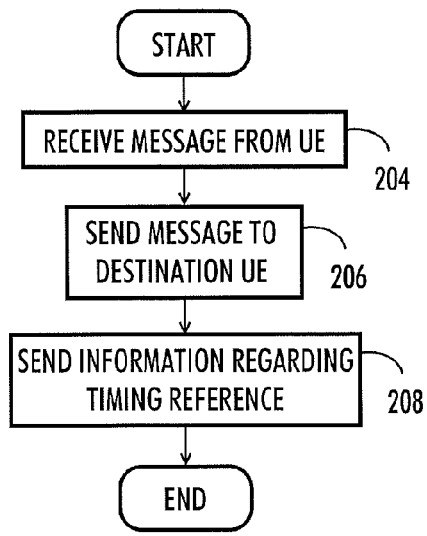

FIG. 2B is another flow chart illustrating an embodiment. In step 204, the eNodeB 100A receives a message from the user equipment 110A, the message comprising information on the establishment of a device-to-device connection with at least one other set of user equipment, for example the user equipment 114A.

In step 206, the eNodeB sends a message to the at least one other set of user equipment 114A regarding the establishment. The eNodeB may request a confirmation from the user equipment 114A that the device-to-device connection may be set up.

Assuming a positive reply, the eNodeB transmits information regarding a timing reference for paging messages between the user equipment in step 208. The message may be transmitted to both UEs.

Figure 2D:
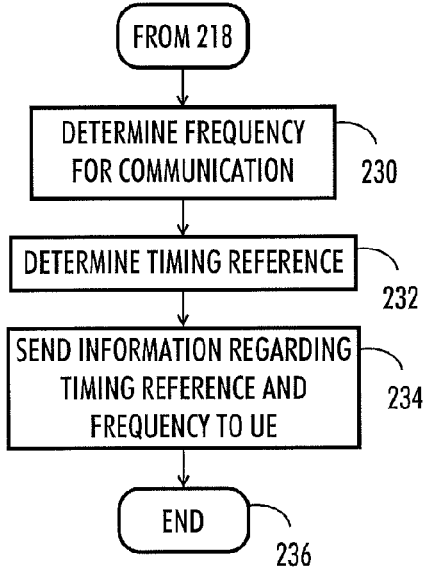
Figure 2E:
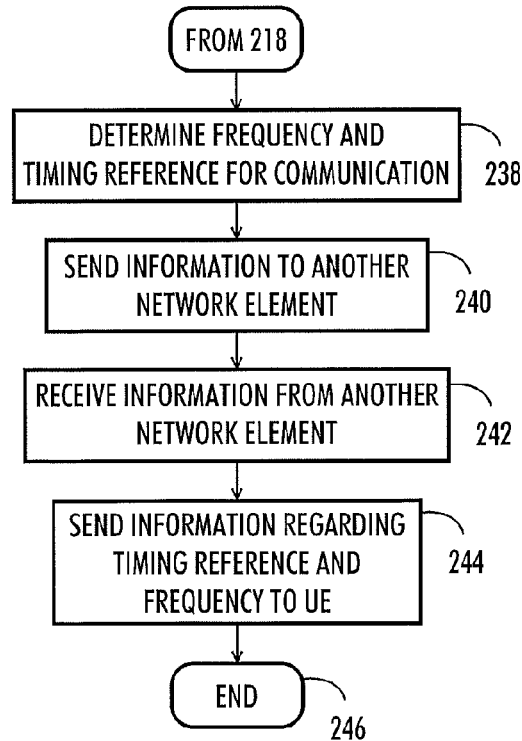
Figure 2C:
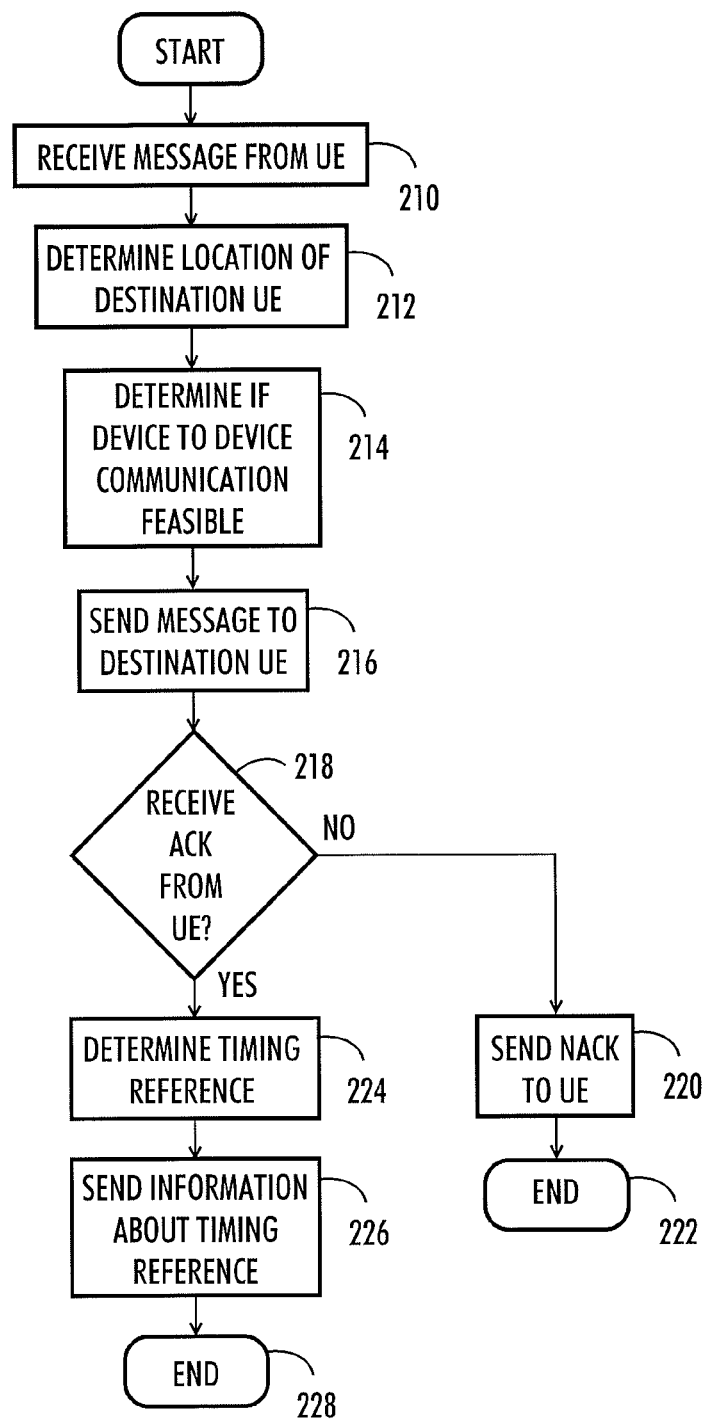

FIG. 2C is a flow chart illustrating an embodiment.

In step 210, an eNodeB receives a message from the user equipment 110A, the message comprising information on the establishment of a device-to-device connection with at least one other set of user equipment (like in step 200 above).

In an embodiment, the eNodeB acknowledges the correct reception of the message to the user equipment.

In step 212, the eNode determines the location of the destination user equipment with which the user equipment 110A wishes to communicate. The destination user equipment may be in the service area of the eNodeB, it may be in the service area of another eNodeB, or in another system or network. For example, the UE 114A which is under the eNodeB 100A may wish to communicate 120A directly with the UE 116A which is under the eNodeB 102A.

In step 214, the eNodeB determines if the device-to-device connection is feasible. The eNodeB may evaluate the interference situation in the area. If the communication frequencies in the area are congested or the network determines that the devices are too far apart from each other, that device-to-device communication may not be possible. Here we assume that communication is possible.

In step 216, the eNodeB sends a message regarding the establishment to the destination user equipment. The eNodeB may request a confirmation from the user equipment that the device-to-device connection may be set up (like in step 206 above).

In step 218, the eNodeB checks if the destination user equipment accepts the connection. If not, a message is sent in step 220 to the UEs that the procedure is terminated and the process ends in 222.

If the procedure continues, the timing reference for paging messages between the UEs is determined in step 224.

In an embodiment, the determined timing reference is within a predetermined time instant from the time instants reserved for paging messages of the system the apparatus is connected to. This saves the user equipment power consumption as the device may be powered off during periods when paging is not allowed.

In an embodiment, the network adjusts the time instants when the UE is configured to listen to the paging messages from the network. The timing reference may be also such that both participants are allowed to transmit and receive at the same time, utilising either a Time Division Duplex (TDD) type or Frequency Division Duplex (FDD) type of operation.

In step 226, information regarding the timing reference is sent to the UEs.

The process ends in 228

The above steps may be performed by the eNodeB which received the message of step 210. The steps may be performed at least in part by other network elements of participating systems. If the destination user equipment is under another eNodeB, the another eNodeB may take part in the process. For example, if the UE 114A of FIG. 1A is establishing a connection 120A to the UE 116A, both eNodeBs 100A and 102A may take part in the process.

If an UMTS system is in question, a Radio Network Controller (RNC) of the UMTS system may take part in the process. One or more network elements of the Core Network (CN) of the system may take part in authentication processes. In LTE, Mobility Management Entity may take part in location processes.

FIG. 2D is a flow chart illustrating an embodiment. The flow chart illustrates another way of implementing the steps 224 and 226 of FIG. 2C.

We enter this flow chart from step 218 of FIG. 2C,

In step 230, the communication carrier, frequency or frequency band for sending and receiving paging messages between the apparatuses establishing a device-to-device communication is determined. In an embodiment, the device-to-device communication is executed on a different communication carrier, frequency or frequency band compared to normal network communication. This reduces the interference in the network.

The eNodeB (RNC) has information at which frequency device-to-device communication is allowed in the area. It may also be configured to receive device capability info to make sure devices establishing a device-to-device communication are capable of communicating on the same frequency band. The participating network elements may also exchange such information.

In step 232, the timing reference for paging messages between the UEs is determined. In an embodiment, different timing references for sending and receiving paging messages between the user equipment is determined. This applies especially when Time Division Duplex is used. However, the user equipment may also use the same timing reference and possible collisions between messages may be resolved with a suitable recovery mechanism.

In step 234, information regarding the communication frequency band and the timing references is sent to the UEs.

The process ends in 236.

FIG. 2E is a flow chart illustrating another embodiment. In this example, the participating UEs are under different eNodeBs or systems. One of the UEs could be in LTE and the other in UMTS. In another example, the UEs could be under different RNCs in UMTS. In another example, the UEs could be in different tracking areas in an LTE system. The flow chart illustrates another way of implementing the steps 224 and 226 of FIG. 2C.

In step 238, the eNodeB 100A determines the timing reference for paging messages and the communication carrier, frequency or frequency band for sending and receiving paging messages as described above.

In step 240, information regarding the timing references and frequency is transmitted to another network element 138B. For example, the eNodeB which received the message from UE desiring a device-to-device communication may send the information to the eNodeB serving the other participant. In another example, the RNC serving the base station to which the UE is connected may send information to the RNC serving the base station the other UE is connected to.

In step 242, the eNodeB 100A receives information regarding the timing references and frequency from the other network element 138B. The other network element may have adjusted the timing references.

In step 244, the information regarding the communication frequency band and the timing references is sent to the UEs. If the UEs are under different eNodeBs or RNCs, the information may be sent via another network element.

The process ends in 246.

Figure 3:
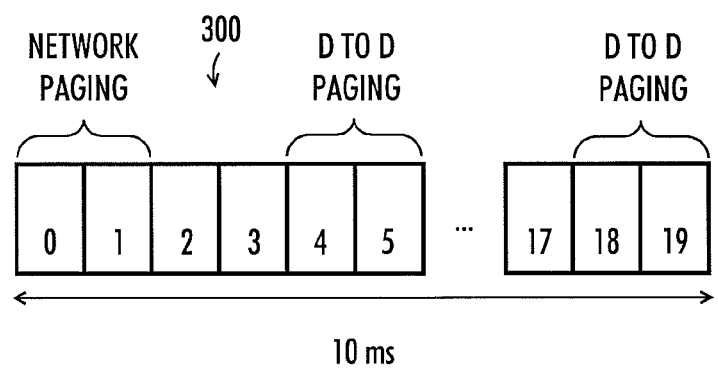
FIG. 3 illustrates an example of the frame structure of uplink LTE-Advanced transmission.

FIG. 3 illustrates an example of the frame structure of uplink LTE-Advanced transmission. The frame 300 comprises 20 time slots, numbered from 0 to 19. In this example, the network transmits paging messages to user equipment in time slots 0 and 1. The UE has requested device-to-device communication and the network has allocated time slots 4 and 5 for the UE to transmit paging messages and time slots 18 and 19 for the other UE to transmit paging messages.

The timing of the UE transmission is not perfectly synchronised as timing advance is not utilized in device-to-device communication.

In the above example, the UEs were given different timing references for paging messages. If only one timing reference were allocated for both UEs, it could be time slots 18 and 19, for example.

In an embodiment, the UE may be in RRC-connected mode simultaneously when requesting device-to-device communication. For example, the UE may be running an application requiring resources for communication with the system the UE is connected to. In such a case the timing instants for device-to-device communication are selected to be non-overlapping with the time instants reserved for receiving scheduled packets from the system the UE is connected to.

Referring to FIG. 1B, the user equipment 110A comprises a controller 120B which controls the operation of the apparatus. The controller 120B is configured to control the transmitter 124A to send a message to a network element, the message comprising information on the establishment of a device-to-device connection with at least one apparatus; and receive from the network element information regarding a timing reference for paging messages between the apparatuses establishing a device-to-device communication.

The controller may be configured to store the information regarding a timing reference in a memory 122B.

The controller 120B may be configured to control the transmitter 124A to communicate with other set of user equipment utilizing the resources received from the network.

The network element 100A comprises a controller 130B which controls the operation of the device. The controller 130B is configured to control the transmitter 134A to receive a message from user equipment, the message comprising information on the establishment of a device-to-device connection with at least one other set of user equipment, send a message to the at least one another user equipment regarding the establishment; and send information regarding a timing reference for paging messages between the apparatuses establishing a device-to-device communication to the apparatuses.

In an embodiment, the controller 130B is configured to determine if a device-to-device connection between user equipment is feasible after receiving a message from user equipment requesting timing reference. The controller 130B may be configured to determine timing references and a frequency band for sending and receiving paging messages between the apparatuses establishing a device-to-device communication and store the information regarding timing reference and frequency band in a memory 132B.

The controller 130B may be configured to be in connection with another device 138B via an interface 140B when information is determined.

In an embodiment, the controller 130B is configured to receive at least part of the information from another network element.

The other network element 138B may be configured to determine timing references and a frequency band for sending and receiving paging messages between the apparatuses on the basis of information received from the network element 100A, the participating UEs and other parts of the network.

In an embodiment, the other network element may be connected to user equipment (not shown in FIG. 1B) participating in a device-to-device communication with the user equipment 110A.

In an embodiment, the controller 142B of the other network element 138B is configured to control the interface 146B to receive information regarding a timing reference for device-to-device paging messages. The controller may be configured to adjust the timing reference if necessary and control the interface to send the adjusted timing reference to the network element 100A.

The steps, signalling messages and related functions described in the attached figures are in no absolute chronological order, and some of the steps may be performed simultaneously or in an order differing from the given one.

Other functions can also be executed between the steps or within the steps and other signalling messages sent between the illustrated messages. Some of the steps can also be left out or replaced with a corresponding step. The signalling messages are only exemplary and may even comprise several separate messages for transmitting the same information. In addition, the messages may also contain other information.

The apparatuses or controllers able to perform the above-described steps may be implemented as an electronic digital computer, which may comprise a working memory (RAM), a central processing unit (CPU), and a system clock. The CPU may comprise a set of registers, an arithmetic logic unit, and a controller. The controller is controlled by a sequence of program instructions transferred to the CPU from the RAM.

The controller may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

An embodiment provides a computer program embodied on a distribution medium, comprising program instructions which, when loaded into an electronic apparatus, are configured to control the apparatus to execute the embodiments described above.

The computer program may be in source code form, object code form, or in some intermediate form, and it may be stored in some sort of carrier, which may be any entity or device capable of carrying the program. Such carriers include a record medium, computer memory, read-only memory, an electrical carrier signal, a telecommunications signal, and a software distribution package, for example. Depending on the processing power needed, the computer program may be executed in a single electronic digital computer or it may be distributed amongst a number of computers.

The apparatus may also be implemented as one or more integrated circuits, such as application-specific integrated circuits ASIC. Other hardware embodiments are also feasible, such as a circuit built of separate logic components. A hybrid of these different implementations is also feasible.

When selecting the method of implementation, a person skilled in the art will consider the requirements set for the size and power consumption of the apparatus, the necessary processing capacity, production costs, and production volumes, for example.

It will be obvious to a person skilled in the art that, as technology advances, the inventive concept can be implemented in various ways. The invention and its embodiments are not limited to the examples described above but may vary within the scope of the claims.

The invention claimed is:

1. An apparatus comprising:
   at least one processor; and
   at least one memory including computer program code, where the at least one memory and the computer program code are configured, with the at least one processor, to cause the apparatus to at least:
   send a message to a network element of a communication system, the message comprising information on establishment of a device-to-device communication with at least one apparatus; and
   receive from the network element information regarding a timing reference for communicating paging messages with apparatuses of the at least one apparatus establishing the device-to-device communication, wherein the timing reference is non-overlapping with time instants reserved for receiving packets from the communication system, and wherein the timing reference is within a predetermined time instant from time instants reserved for paging messages of the communication system the apparatus is connected to.

2. The apparatus of claim 1, wherein the at least one memory and the computer program code is configured with the at least one processor to cause the apparatus to send a message comprising an identifier of the at least one apparatus.

3. The apparatus of claim 1, wherein the at least one memory and the computer program code is configured with the at least one processor to cause the apparatus to send the message using control channels of the communication system the apparatus is connected to.

4. The apparatus of claim 1, wherein the at least one memory and the computer program code is configured with the at least one processor to cause the apparatus to send the message using a physical uplink shared channel.

5. The apparatus of claim 1, wherein the at least one memory and the computer program code is configured with the at least one processor to cause the apparatus to utilize the timing reference when sending a paging message to the at least one apparatus.

6. The apparatus of claim 1, wherein the at least one memory and the computer program code is configured with the at least one processor to cause the apparatus to receive information comprising different timing references for sending and receiving paging messages with the apparatuses establishing the device-to-device communication.

7. A method comprising:
   sending by an apparatus a message to a network element of a communication system, the message comprising information on establishment of a device-to-device communication with at least one apparatus; and
   receiving by the apparatus from the network element information regarding a timing reference for communicating paging messages with apparatuses of the at least one apparatus establishing the device-to-device communication, wherein the timing reference is non-overlapping with time instants reserved for receiving packets from the communication system, and wherein the timing reference is within a predetermined time instant from time instants reserved for paging messages of the communication system the apparatus is connected to.

8. The method of claim 7, wherein the message comprises an identifier of the at least one apparatus.

9. The method of claim 7, further comprising: sending the message using control channels of the communication system the apparatus is connected to.

10. The method of claim 7, further comprising: utilizing the timing reference when sending a paging message to the at least one apparatus.

11. The method of claim 7, further comprising: receiving information comprising different timing references for sending and receiving paging messages between the apparatuses establishing the device-to-device communication.

12. An apparatus comprising:
    at least one processor; and
    at least one memory including computer program code, where the at least one memory and the computer program code are configured, with the at least one processor, to cause the apparatus to at least:
    receive a message from user equipment of a communication system, the message comprising information on establishment of a device-to-device communication with at least one other user equipment,
    send a message regarding the establishment to the at least one other user equipment;
    send information to the user equipment regarding a timing reference for paging messages between the user equipment establishing a device-to-device communication, wherein the timing reference is non-overlapping with time instants reserved for packets from the communication system, and wherein the timing reference is within a predetermined time instant from time instants reserved for paging messages of the communication system the apparatus is connected to.

13. The apparatus of claim 12, wherein the at least one memory and the computer program code is configured with the at least one processor to cause the apparatus to determine if a device-to-device communication between user equipment is feasible.

14. The apparatus of claim 12, wherein the at least one memory and the computer program code is configured with the at least one processor to cause the apparatus to receive a message comprising information on an identifier of the at least one other user equipment.

15. The apparatus of claim 12, wherein the at least one memory and the computer program code is configured with the at least one processor to cause the apparatus to send information comprising different timing references for sending and receiving paging messages between the user equipment establishing a device-to-device communication.

16. The apparatus of claim 12, wherein the at least one memory and the computer program code is configured with the at least one processor to cause the apparatus to receive an acknowledgement of the device-to-device communication from the at least one another user equipment.

17. The apparatus of claim 12, wherein the at least one memory and the computer program code is configured with the at least one processor to cause the apparatus to communicate with the at least one other user equipment via another network element.

18. The apparatus of claim 12, wherein the at least one memory and the computer program code is configured with the at least one processor to cause the apparatus to exchange information regarding the timing references with another network element.

19. The apparatus of claim 12, wherein the at least one memory and the computer program code is configured with the at least one processor to cause the apparatus to determine timing references for sending and receiving paging messages between the user equipment establishing the device-to-device communication.

20. The apparatus of claim 12, wherein the at least one memory and the computer program code is configured with the at least one processor to cause the apparatus to determine a communication frequency for sending and receiving paging messages between the user equipment establishing the device-to-device communication.

21. A method comprising:
receiving a message from user equipment of a communication system, the message comprising information on the establishment of a device-to-device connection with at least one other user equipment,
sending a message regarding the establishment to the at least one other user equipment; and
sending information regarding a timing reference for paging messages between the user equipment establishing the device-to-device communication, wherein the timing reference is non-overlapping with time instants reserved for packets from the communication system, and wherein the timing reference is within a predetermined time instant from time instants reserved for paging messages of the communication system.

22. The method of claim 21, further comprising: determining if the device-to-device communication between the user equipment is feasible.

23. The method of claim 21, further comprising: sending information comprising different timing references for sending and receiving paging messages between the user equipment establishing the device-to-device communication.

24. The method of claim 21, further comprising: determining timing references for sending and receiving paging messages between the user equipment establishing the device-to-device communication.

25. The method of claim 21, further comprising: determining a communication frequency for sending and receiving paging messages between the user equipment establishing the device-to-device communication.

26. An apparatus comprising:
means for sending a message to a network element of a communication system, the message comprising information on establishment of a device-to-device communication with at least one other apparatus; and
means for receiving from a network element information regarding a timing reference for paging messages with the at least one other apparatus establishing the device-to-device communication, wherein the timing reference is non-overlapping with time instants reserved for receiving packets from the communication system, and wherein the timing reference is within a predetermined time instant from time instants reserved for paging messages of the communication system the apparatus is connected to.

27. An apparatus comprising:
means for receiving a message from user equipment of a communication system, the message comprising information on the establishment of a device-to-device communication with at least one other user equipment,
means for sending a message to the at least one other user equipment regarding the establishment; and
means for sending information regarding a timing reference for paging messages the at least one other user equipment establishing the device-to-device communication, wherein the timing reference is non-overlapping with time instants reserved for packets from the communication system, and wherein the timing reference is within a predetermined time instant from time instants reserved for paging messages of the communication system the apparatus is connected to.

28. The apparatus of claim 27, comprising means for determining if a device-to-device communication between user equipment is feasible.

29. The apparatus of claim 27, comprising means for exchanging information regarding the timing references with another network element.

30. A non-transitory computer readable memory embodying a program of instructions executable by a processor to perform actions directed at establishing a connection, the actions comprising:
sending a message to a network element of a communication system, the message comprising information on establishment of a device-to-device communication with at least one apparatus; and
receiving from a network element information regarding a timing reference for paging messages with the at least one apparatus establishing the device-to-device communication, wherein the timing reference is non-overlapping with time instants reserved for receiving packets from the communication system, and wherein the timing reference is within a predetermined time instant from time instants reserved for paging messages of the communication system.

31. A non-transitory computer readable memory embodying a program of instructions executable by a processor to perform actions directed at establishing a connection, the actions comprising:
receiving a message from user equipment of a communication system, the message comprising information on establishment of a device-to-device communication with at least one other user equipment,
sending a message to the at least one other user equipment regarding the establishment; and
sending information regarding a timing reference for paging messages with the at least one other user equipment establishing the device-to-device communication, wherein the timing reference is non-overlapping with time instants reserved for packets from the communication system, and wherein the timing reference is within a predetermined time instant from time instants reserved for paging messages of the communication system.

* * * * *